United States Patent [19]

Takeda et al.

[11] Patent Number: 4,651,148

[45] Date of Patent: Mar. 17, 1987

[54] LIQUID CRYSTAL DISPLAY DRIVING WITH SWITCHING TRANSISTORS

[75] Inventors: Makoto Takeda, Tenri; Kunihiko Yamamoto, Nara; Nobuaki Matsuhashi; Naofumi Kimura, both of Tenri; Hiroshi Hamada, Nara; Hiroshi Take, Ikoma, all of Japan

[73] Assignee: Sharp Kabushiki Kaisha, Osaka, Japan

[21] Appl. No.: 647,752

[22] Filed: Sep. 6, 1984

[30] Foreign Application Priority Data

Sep. 8, 1983 [JP] Japan .................................. 58-167153
Dec. 22, 1983 [JP] Japan .................................. 58-249782

[51] Int. Cl.$^4$ .............................................. G09G 3/36
[52] U.S. Cl. ..................... 340/805; 340/811; 340/784
[58] Field of Search ............... 340/783, 784, 802, 805, 340/811, 718, 719

[56] References Cited

U.S. PATENT DOCUMENTS

4,117,472  9/1978  Freer et al. ........................... 340/805
4,427,979  1/1984  Clerc et al. ........................... 340/784

Primary Examiner—Gerald L. Brigance
Attorney, Agent, or Firm—Birch, Stewart, Kolasch and Birch

[57] ABSTRACT

A matrix liquid crystal display device provided with switching transistors, made of amorphous silicon thin-film for example, which are connected to each display picture element. The switching transistors are scanned with a scan pulse having width H which is set at a value greater than that is expressed by T/N, where H denotes the scan pulse width applied to row electrodes connected to each gate of the switching transistor, T denotes the total scan time and N the number of the scan lines. Concretely, the timewise width of the scan pulses is expanded or the number of applicable scan pulses is increased. The preferred embodiments relate to such a liquid crystal display driving system that can effectively minimize the decline of the voltage and the display characteristics caused by insufficient charge against the display picture element electrodes via the switching transistors. In particular, the driving method embodied by the present invention is extremely useful for driving a large-capacity X-Y matrix liquid crystal display device.

5 Claims, 8 Drawing Figures

LIQUID CRYSTAL DISPLAY DRIVING WITH SWITCHING TRANSISTORS

BACKGROUND OF THE INVENTION

The present invention relates to a matrix liquid crystal display device, more particularly, to a method of driving a matrix liquid crystal display device provided with switching transistors for respective picture elements.

Figure 1:
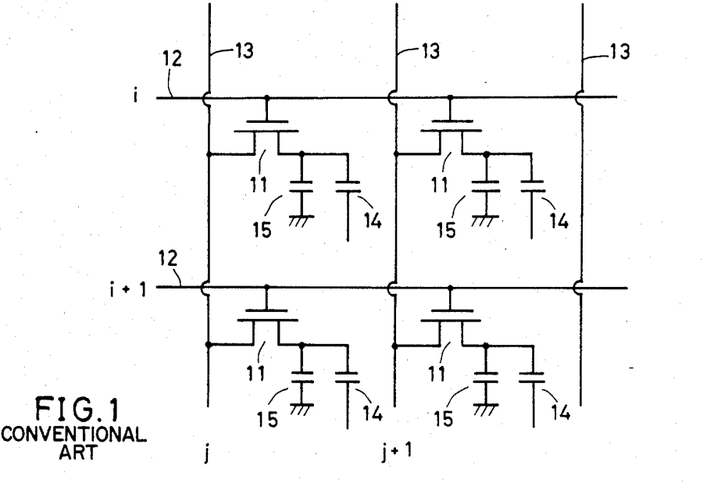
FIG. 1 shows the equivalent circuit diagram of a matrix LCD device provided with switching transistors.

Conventionally, it is well known that, even when a small-duty drive or a multi-line multiplex drive is performed, a high-contrast display equivalent to a static-drive display can be achieved in such a matrix liquid crystal display device using switching transistors built into the LCD panel. This is typically represented by an equivalent circuit shown in FIG. 1. In FIG. 1, reference number 11 indicates a switching transistor, which is conventionally composed of such a field effect transistor containing semiconductive elements such as a mono-crystal, multi-crystal or amorphous silicon (Si), tellurium (Te), or cadmium-selenium (CdSe) compound, etc. Reference number 12 indicates row electrodes and 13 column electrodes, which are respectively connected to the gate electrode and the source electrode of switching transistor 11. Reference number 14 indicates liquid-layer capacitors sandwiched between the display picture element electrode and the opposite electrode. Reference number 15 indicates charge storage capacitors, which are provided to compensate for insufficient charge capacitance of liquid-layer capacitors. In reference to the equivalent circuit shown in FIG. 1 and the drive signal waveforms in FIG. 2, functional principles of the liquid crystal display device are described below.

Figure 2:
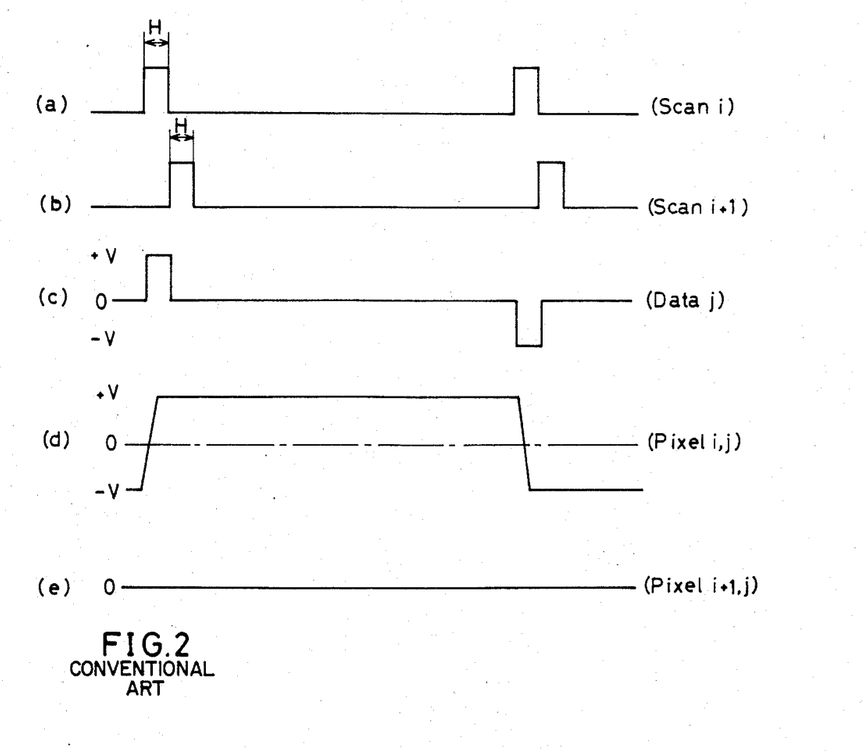
FIG. 2 shows signal waveforms of electrodes in a conventional drive method.

FIG. 2 (a) and (b) respectively show scan pulses applied to the first and (+1)th row electrodes 12. Such a pulse voltage containing the width H that turns the switching transistor 11 ON during the period H=T/N (where T denotes the total scan time and N the number of the scan line) is sequentially fed to each row electrode 12 so that each row electrode turns ON. FIG. 2 (c) indicates the data signal waveforms applied to the j-th column electrode 13. Transistors in each row sequentially turn ON at the j-th position. Voltage waveforms corresponding to such a voltage fed to the picture elements of respective rows are synchronously sent to the column electrode 13. FIG. 2 (c) indicates such a case in which V-volt is applied to the i-th picture element at the j-th position and 0-volt to all other picture elements. Data signal waveforms are fed in order to invert the polarity in each scan period to allow the liquid crystal display to be driven by AC power. With reference to FIG. 1, picture elements of the i-th row and the j-th column are described below. When the switching transistor 11 turns ON, the column electrodes start to charge the liquid crystal display's liquid capacitor 14 and the storage capacitor 15 via resistor RON of transistor 11, causing the potential of the display picture element electrodes to become the same +V as that of data signals. When the switching transistor 11 turns OFF, the charge remains unaffected allowing the +V potential of the display picture element electrodes to remain. When transistor 11 turns ON again, reverse charging is performed so that the potential of the display picture element electrodes becomes −V, which is maintained during the following OFF period. As a result, the display picture element electrodes will receive such a voltage waveform very close to the rectangular waveform shown in FIG. 2 (d). Liquid crystals are driven while the potential of the opposite electrodes is zero volt with the V-value above the threshold value of liquid crystals.

Next, picture elements in the (i+1)th row and the j-th column are described below. In this case, the display picture element electrode is charged to become zero volt and remains charged as shown in FIG. 2 (e), and as a result, no voltage is fed to liquid crystals, which then turn OFF. As described above, despite the multiplex drive thus performed, since such a stable voltage corresponding to the static driving can be supplied to liquid crystals, an extremely high-contrast display can be achieved using the liquid crystal display drive embodied by the present invention.

Figure 3:
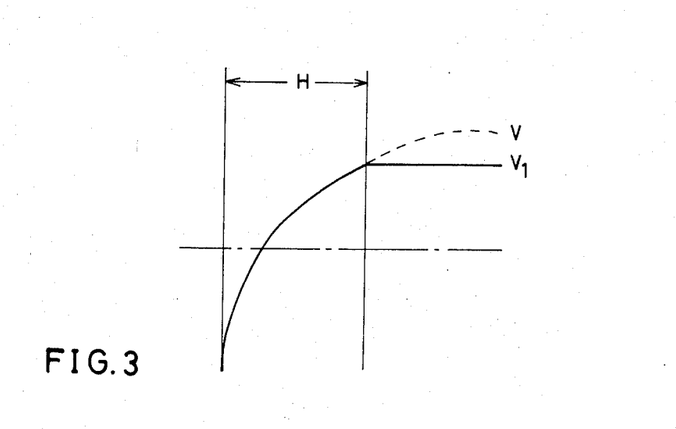
FIG. 3 shows the charge curve indicating the declined voltage when the display picture element electrodes are insufficiently charged.

In the drive method described above, it is desirable that the time constants RON and CL (where RON denotes the onresistor of the switching transistors and CL the parallel capacitor of charge storage capacitors) be set substantially shorter than the scan pulse width H and also that charging of the capacitors sufficiently performed until the potential of the display picture element electrodes is equal to the voltage V of the data signal waveforms. This is because, if the time constants RON and CL are not less than the scan pulse width H and the display picture element electrodes are insufficiently charged, then even if the voltage V is fed to the column electrodes 13, liquid crystals cannot receive enough voltage. The liquid crystals receive voltage Vl only, as shown in FIG. 3. In addition, if such a condition exists, voltage Vl being fed to liquid crystals can be varied by the time constants RON and CL. As a result, if each picture element in the display unit contains varied values of the time constants RON and CL, such variations may adversely affect the display contrast effect, thus eventually causing a great obstruction against such a specific display requiring interim tones as in the display of TV pictures.

In the above driving method, the scan pulse width H can be calculated by H =(total scan time T)÷(number of scan lines N). However, since T cannot be set at such a large value due to possible flicker of liquid crystals, the value H cannot be set at any value greater than a specific limit. Since it is necessary to retain a specific charge, capacitance CL cannot be reduced. Likewise, on-resistor value cannot also be reduced when using a transistor containing semiconductive elements with low conductivity. These often cause such an obstruction mentioned above.

OBJECT AND SUMMARY OF THE INVENTION

In light of various problems related to the conventional method of driving the matrix liquid crystal display device mentioned above, the present invention aims at providing an extremely useful method for driving a matrix liquid crystal display device, with which, a very satisfactory display contrast effect can be achieved even when the on-resistor value of the switching transistor cannot be reduced sufficiently.

Figure 4:
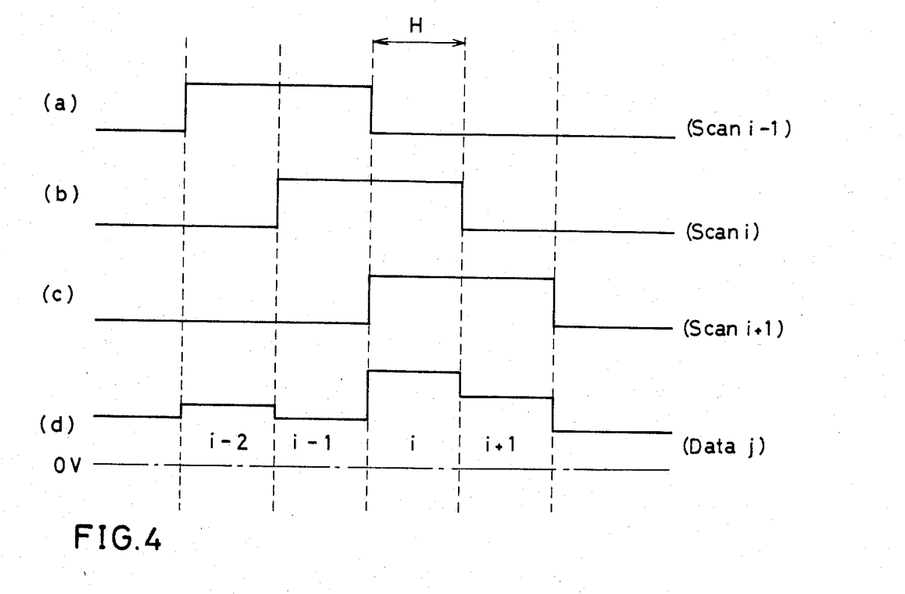
FIGS. 4 and 5 respectively show signal waveforms of respective electrodes of a drive method according to the preferred embodiment of the present invention.

The method of driving the matrix LCD device according to the preferred embodiment of the present invention features means for making the scan pulse width H greater than the value T/N (where T denotes the total scan time and N the number of scan lines), in which the scan pulse width H is applied to row electrodes which are connected to each gate of the switching transistor. The preferred embodiment makes it possible to enlarge the width of the scan pulse applied to adjacent row electrodes by generating a time overlap, with the waveforms generated during the drive being shown in FIG. 4. An example of FIG. 4 indicates such a case in which the scan pulse width is expanded to be twice the value of H. FIG. 4 (a), (b), and (c) show the scan pulse waveforms that are respectively applied to the (i−1)th, i-th, and the (i+1)th row electrodes, whereas (d) shows the data signal waveform applied to the j-th column electrode. Compared to those typical waveforms generated by a conventional drive method shown in FIG. 2, the drive method incorporating the preferred embodiment causes the scan pulse width to be expanded by varying the timing for turning the switching transistor OFF with ON.

Figure 5:
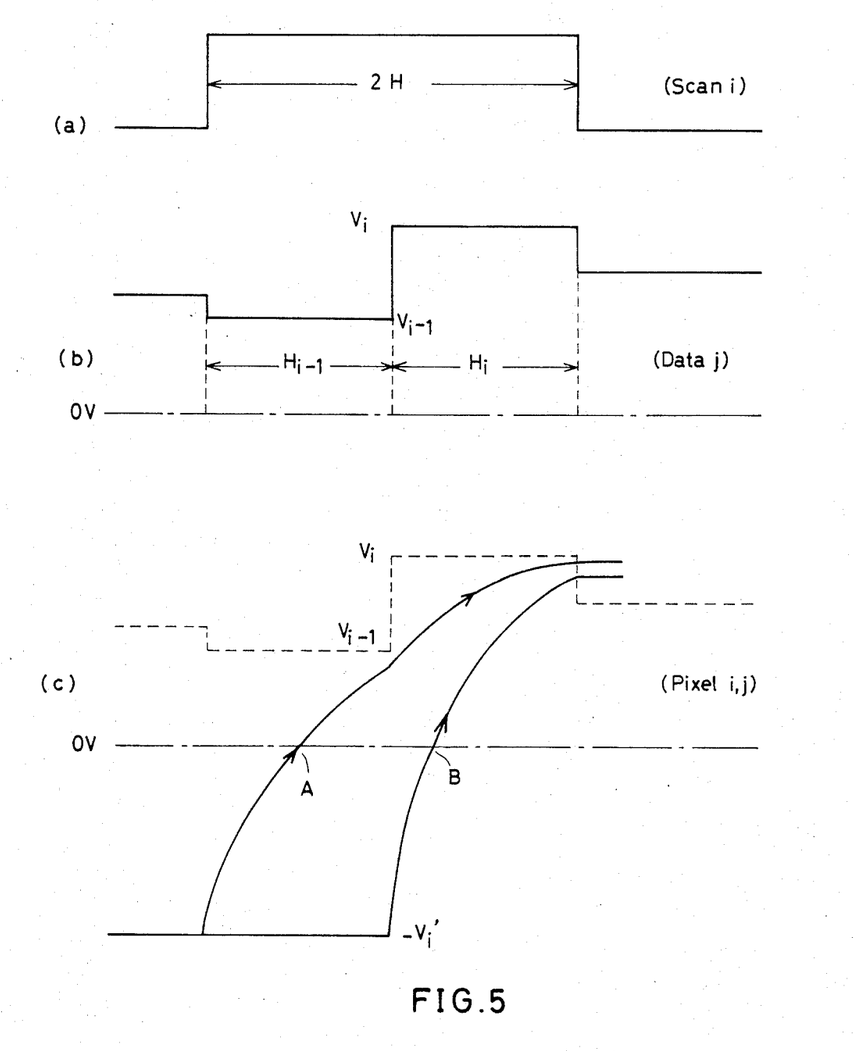

With reference to the picture elements in the i-th–j-th row electrode positions and also by referring to FIG. 5, principles of these operations are described below. FIG. 5 (a), (b), and (c) respectively show the scan pulse waveforms at the i-th row and the picture element display electrode potential at the j-th column. Vi-1 and Vi respectively indicate the data voltages dealing with the (i−1)th row and the i-th row. When switching transistor 11 turns on during the Hi−1 period, the display picture element electrodes in the i-th through j-th columns charge the data voltage Vi−1 in the preceding row, and during the next Hi period, they also charge the data voltage Vi, thus making up the charge curve A shown in FIG. 5 (c). Compared to a conventional method (see the charge curve B shown in FIG. 5 (c) ), the drive method based on the preferred embodiment can charge a greater voltage. When Vi−1 and Vi are almost equivalent to each other as in the AC drive used for displaying TV pictures, the drive method based on the preferred embodiment expands the scan pulse width twice so that the same effect as if the time constants RON and CL were reduced to one half without the expanded scan pulse width can be achieved. When the scan pulse width is expanded, unlike the case of reducing the time constants RON and CL without expanding the pulse width, a certain difference may be generated due to any difference between Vi−1 and Vi. However, if the expanded width of the scan pulse is not substantially greater than the total scan time, the difference of value is still smaller than that of liquid crystal drive voltage, thus creating no problem at all.

Figure 7:
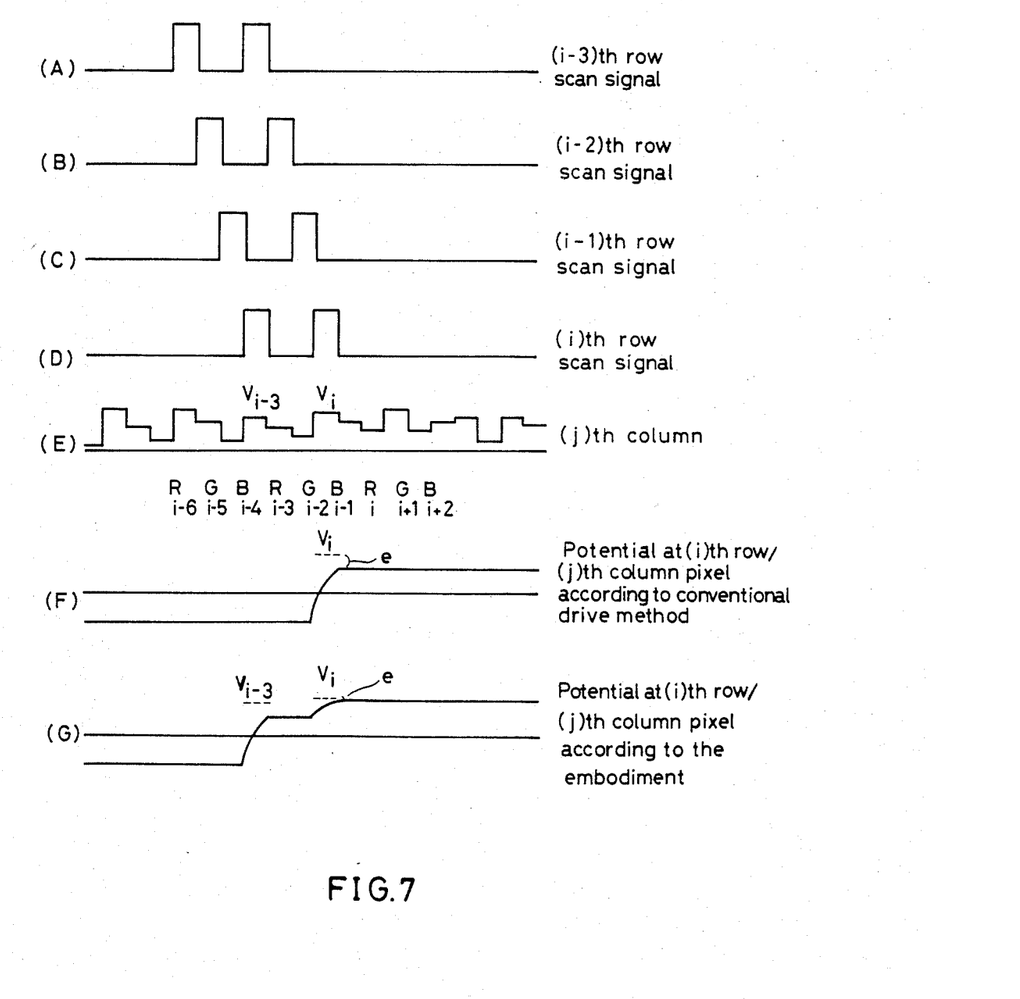
FIG. 7 shows signal waveforms generated by various electrodes in a LCD drive system according to another preferred embodiment of the present invention.
Figure 8:
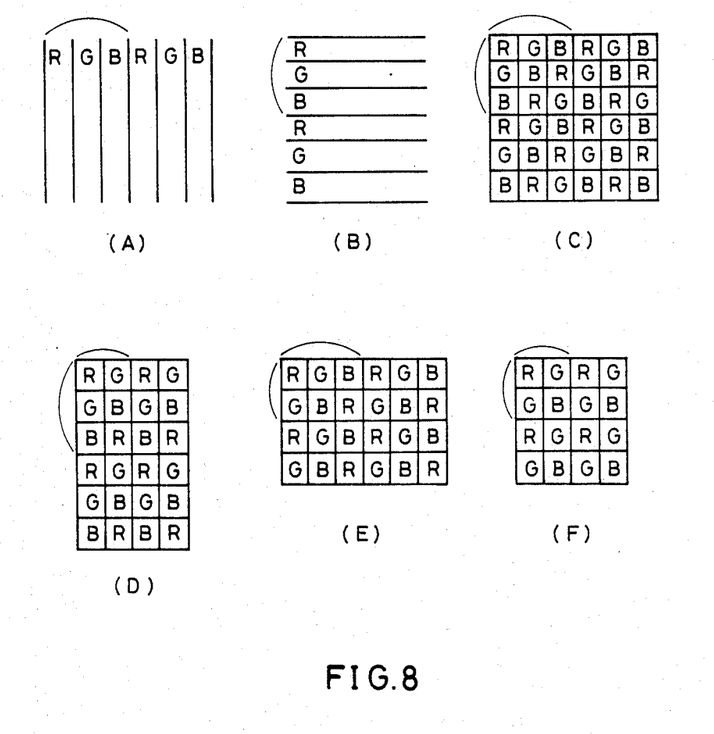
FIG. 8 shows a typical example of colored patterns.

A still further preferred embodiment of the present invention related to such a matrix liquid crystal display device containing colored patterns realizes the following:

When a period of color patterns in a longitudinal direction corresponds to the picture element n, the drive method according to the still further preferred embodiment provides the same effect as if the scan pulse width were substantially expanded by preliminarily charging electrodes using the data signal of the picture elements in the row containing the same color patterns, and that precedes the n-row, before actually charging electrodes with data signals. FIG. 7 shows such a case where the scan pulses are applied twice to the 9-picture element pattern (FIG. 8-c) containing 3 picture elements of the color period in the longitudinal direction. FIG. 7 (a) through (d) respectively show the scan pulse waveforms applied to the (i−3)th through i-th row electrodes, whereas (e) shows the data signal waveforms applied to the j-th column electrode. Compared to the conventional drive waveform (g), the drive waveform (g) of the preferred embodiment substantially expands the scan pulse width by preliminarily charging electrodes with data signals fed from the same color row that precedes the n-row. With reference to picture elements in the i-th row and the j-th column, principles of these operations are described below.

FIG. 7 (g) shows the potential of the display picture element electrodes in the i-th row and the j-th column. Vi−n and Vi respectively indicate the data voltages dealing with the (i−n)th row and the i-th row. In the beginning of each field, each picture element remains charged in a reversed polarity by the preceding field. Next, when the switching transistor 11 turns ON, the display picture element electrodes in the i-th row and the j-th column start the preliminary charge against the data voltage Vi−n that precedes the n-row. The switching transistor 11 then turns OFF during Hi−n+1 through Hi−1 periods and again turns ON during the next Hi period, thus activating charge against the data voltage Vi. As a result, a charge curve such as shown in FIG. 7 (g) is achieved, allowing these electrodes to charge voltages to such a level higher than the conventional drive method shown in FIG. 7 (f). When the data signals Vi−n and Vi contain the same colors as in the TV picture and have a relationship close to each other, the drive method according to the preferred embodiment then provides the same effect as if the time constants RON and CL were reduced to one half without expanding the scan pulse width by applying the scan pulse twice as described earlier.

When the scan pulse width is expanded, unlike the case of reducing the time constants RON and CL without expanding the scan pulse width, a certain difference may be generated by any difference between Vi−n and Vi. However, if Vi−n and Vi are closely related and less number of rounds are needed to apply the scan pulse against the total scan numbers as in the video signals, such a difference is still smaller than the liquid crystal drive voltage, thus creating no problem at all. In the above preferred embodiments, use of the three primary colors' period in the longitudinal direction has been described. The drive method according to the preferred embodiment can also be applied to such cases where two-color elements comprise a color period and any other number of color elements are made available. Likewise, a pulsation number is not limited only to two rounds.

As is clear from the foregoing description, the preferred embodiments of the present invention realizes such a unique drive method that effectively minimizes the voltage decline caused by incomplete charge against the display picture element electrodes through the switching transistors, and yet, effectively prevents possible degradation of the display characteristics. The present invention is extremely useful for stably driving an X-Y matrix liquid crystal display device featuring a large capacity.

DETAILED DESCRIPTION OF THE EMBODIMENTS

Figure 6:
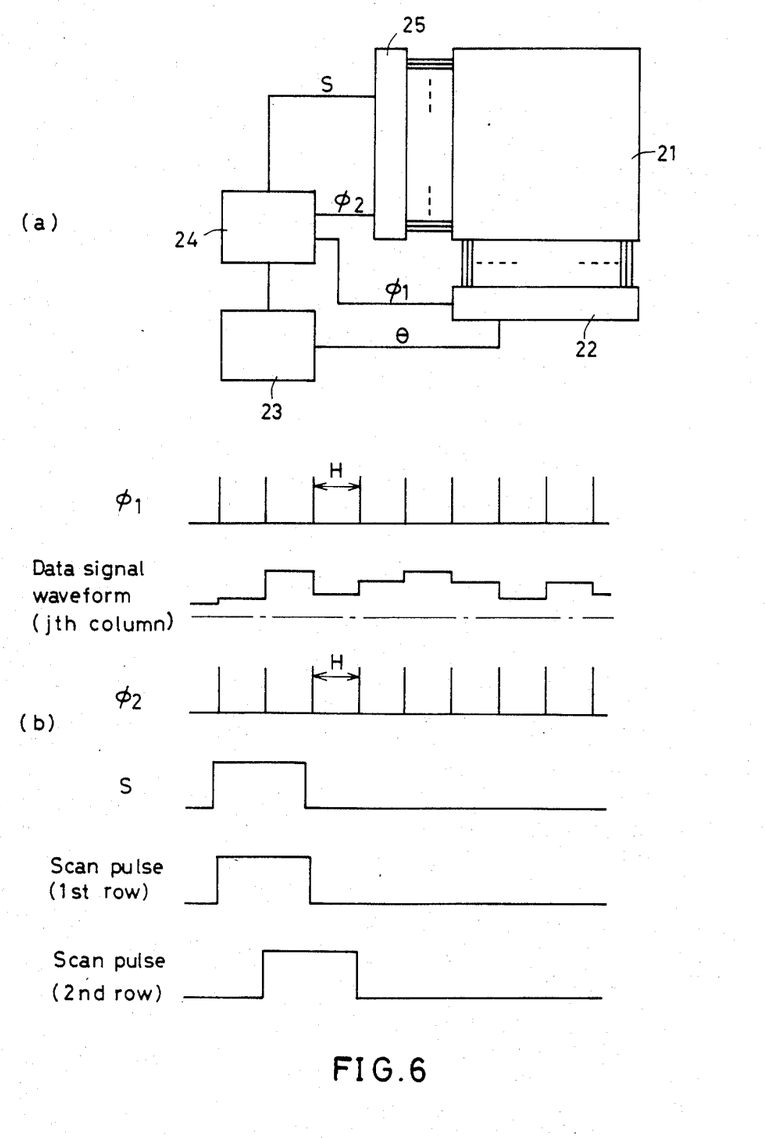
FIG. 6 shows the block diagram of the circuit configuration and signal waveforms according to the preferred embodiment of the present invention.

FIG. 6 (a) and (b) respectively show the block diagram of a drive circuit and waveforms according to the preferred embodiment of the present invention. A plurality of matrix electrodes are formed by both the row and column electrodes in the LCD panel 21. Switching transistors are provided in each crossing of the matrix electrodes. Column electrodes are connected to the column electrode driver 22 composed of a shift register and a sample holder. The column electrode driver 22 outputs data signal D delivered from the data controller 23 to each column electrode synchronous with the clock pulse $\phi$ from the signal controller 24. On the other hand, row electrodes are respectively connected to the row electrode driver 25 comprising a shift register, which outputs scan pulses to each row electrode by sequentially shifting the reference scan pulse S sent from the signal controller 24 by using the clock pulse $\phi 2$. At the same time, width of the scan pulse can be varied into an integer $\times H$ by varying the width of the reference scan pulse S.

Either a FET type thin-film transistor or a thin-film transistor made of amorphous silicon formed in the cell substrate of the LCD panel 21 is made available for the switching transistor 11, in which the gate electrode of the thin-film transistor is connected to the row electrodes and the source electrode of the transistor is connected to the respective column electrode of the transistor is connected. Either the twist-nematic type liquid crystals or the guest-host effect type liquid crystals are made available, while these liquid crystals receive the drive voltages via the picture element electrodes which are connected to the drain electrodes of the thin-film transistors. Clock pulses $\phi 1$ and $\phi 2$ from the signal controller 24 are respectively delivered to the column electrode driver 22 and the row electrode driver 25. The scan pulse width H provides the pulse intervals for clock pulses $\phi 1$ and $\phi 2$. Data signal D from the data controller 23 is delivered to the column electrode driver 22. FIG. 6 (b) shows the data signal D in the j-th column. Data signal D from the column electrode driver 22 is delivered to column electrodes synchronous with the clock pulse $\phi 1$. The reference scan pulse S has a pulse width of 2H and is delivered to the row electrode driver 25 from the signal controller 24. As a result, the scan pulses sent out of the row electrode driver 25 are sequentially delivered to row electrodes from the first to the last rows, as shown in FIG. 6 (b). Each scan pulse having a pulse width of 2H is sequentially delivered to row electrodes synchronous with the clock pulse $\phi 2$ at the H-delayed intervals. This permits the scan pulses applied between adjacent row electrodes to overlap themselves during a pulse width period H. Although the preferred embodiment uses such means for generating clock pulses $\phi 1$ and $\phi 2$ and such a circuit configuration identical to conventional means, the preferred embodiment has established its unique driving method by expanding the width of the reference scan pulse S.

A still further preferred embodiment causes the number of the scan pulses to vary by dividing the reference scan pulse S into a plurality of pulse arrays synchronous with the coloring period. Such pulses to be delivered to row electrodes connected to each gate of the switching transistors can be composed of a plurality of pulses containing $(n-1) \times H$ of the intervals when the pulse width H is equal to the field time of the number of row electrodes.

Using a color liquid crystal display panel, any desired video picture containing interim colors composed of combination colors applying the same principle as the conventional color CRT can be displayed by feeding video signals containing such colors correctly matching each picture element. Also, the color LCD display panel contains either stripe or mosaic color filters provided against a number of picture element electrodes set in the dot-matrix form. Normally, three primary colors are made available for reproducing a variety of colors. Coloring media are made of filters chosen from suitable deflecting plates, interference filters, or filters made from inorganic or organic dyestuff or pigments. Such coloring media may be provided on the external or internal surface of the substrate that makes up the LCD panel. If it is provided internally, it may be set either above or below the picture element electrodes or the common electrodes. There are two methods of arranging such coloring media made of colored filters, i.e., either the stripe or the mosaic formation. For example, the former includes the vertical stripe shown in FIG. 8 (a), and also the horizontal stripe shown in FIG. 8 (b). The latter includes the 9-picture element step type shown in FIG. 8 (c), the vertical 6-picture element type shown in FIG. 8 (d), the horizontal 6-picture element type shown in FIG. 8 (e), and the 4-picture element type shown in FIG. 8 (f). In addition, there are a number of these variations made available. All of these patterns are periodic both in the vertical and horizontal directions. The period n in the vertical direction that plays a very important role in the preferred embodiments covers 1 picture element in FIG. 8 (a), 3 picture elements in FIG. 8 (b), (c), and (d), and 2 picture elements in FIG. 8 (e) and (f), respectively.

What is claimed is:

1. A liquid crystal display driving system in a liquid crystal display device, comprising:
    a plurality of row electrodes, the number of row electrodes being m;
    a plurality of column electrodes, the number of column electrodes being n;
    a plurality of switching transistors, each of said switching transistors having a gate electrode connected to one of said row electrodes and a source electrode connected to one of said column electrodes;
    a plurality of display elements, each of said display elements being connected to a drain electrode of one of said plurality of switching transistors; and
    means for providing a plurality of scan signals during a scan time T, each scan signal being supplied to one of said m row electrodes;
    means for controlling a pulse width H of each of said scan signals such that $H > T/m$.

2. The liquid crystal display driving system of claim 1 wherein scan signals that are applied to adjacent row electrodes have pulses that overlap in time.

3. The liquid crystal display driving system of claim 1 wherein $H = 2T/m$.

4. Liquid crystal display driving system according to claim 1, wherein said switching transistors are amorphous silicon thin-film transistors.

5. A liquid crystal display driving system in a color picture liquid crystal display device, comprising:
- a plurality of row electrodes;
- a plurality of column electrodes;
- a plurality of switching transistors, each of said switching transistors having a gate electrode connected to one of said row electrodes and source electrode connected to one of said column electrodes;
- a plurality of display elements, each of said display elements being connected to a drain electrode of one of said switching transistors, each of said display elements corresponding to a color of a display, a group of display elements forming a full color mosaic of $m \times n$ elements, where $m \geq 2$; and
- scanning means for producing a plurality of scan signals on said row electrodes during a scan time T, each scan signal being supplied to one of said plurality of row electrodes wherein each of said plurality of scan signals has m pulses where $m = n - 1$ and where each pulse has a switch of $(n-1) \times H$ where H is equal to a time T needed to scan all of the row electrodes divided by the number of row electrodes.

* * * * *